United States Patent [19]
Liston et al.

[11] Patent Number: 5,355,781
[45] Date of Patent: Oct. 18, 1994

[54] CONTROLLED ATMOSPHERE STORAGE SYSTEM

[75] Inventors: Max D. Liston, Irvine, Calif.; Sy J. Banaitis, Wilsonville, Oreg.; Robert J. Olson, Santa Rosa, Calif.

[73] Assignee: Prolong Systems, Inc., Wilsonville, Oreg.

[21] Appl. No.: 843,545

[22] Filed: Feb. 28, 1992

[51] Int. Cl.⁵ .............................................. B60H 1/32
[52] U.S. Cl. ...................................... 99/476; 99/468; 62/78; 426/419
[58] Field of Search ................. 99/476, 473, 474, 468; 426/418, 419, 312; 422/111, 112, 40; 62/78; 95/47; 96/4

[56] References Cited

U.S. PATENT DOCUMENTS

| | | | |
|---|---|---|---|
| 1,819,643 | 8/1931 | Fleisher . | |
| 2,617,275 | 11/1952 | Goff et al. | 62/175.5 |
| 3,205,049 | 9/1965 | Lannert et al. | 422/40 |
| 3,360,380 | 12/1967 | Bedrosian | 99/154 |
| 3,547,576 | 12/1970 | Sheikh | 21/53 |
| 3,725,012 | 4/1973 | Gower | 422/40 |
| 3,937,847 | 2/1976 | Elkins et al. | 422/40 |
| 4,566,282 | 1/1986 | Knoblauch et al. | 62/78 |
| 4,817,391 | 4/1989 | Roe et al. | 62/17 |
| 4,829,774 | 5/1989 | Wassibauer et al. | 62/78 |
| 4,880,441 | 11/1989 | Kesting et al. | 55/16 |
| 5,063,753 | 11/1991 | Woodruff | 62/78 |
| 5,120,329 | 6/1992 | Sauer et al. | 62/78 |
| 5,127,233 | 7/1992 | Coffreld | 426/418 |
| 5,152,966 | 10/1992 | Roe et al. | 99/475 |
| 5,167,243 | 12/1992 | Cowan et al. | 426/419 |

FOREIGN PATENT DOCUMENTS

28492/30 8/1930 United Kingdom .

*Primary Examiner*—David A. Scherbel
*Assistant Examiner*—Reginald L. Alexander
*Attorney, Agent, or Firm*—Stetina and Brunda

[57] ABSTRACT

The present invention is a system for maintaining a controlled oxygen atmosphere within a transport container vessel, such as a bulk rail car through the use of permeable membrane technology. An oilless compressor is used in conjunction with the system so as not to subject the permeable membranes to the derogatory effects associated with the presence of oil within an air stream that circulates through the permeable membranes. The present system further includes an air-sampling system which is used to continuously measure the oxygen levels within the rail car so as to provide verification that the oxygen levels are maintained at 5% or less to kill insects, larvae, or eggs which may be within the bulk materials transported by the rail car.

21 Claims, 3 Drawing Sheets

CONTROLLED ATMOSPHERE STORAGE SYSTEM

FIELD OF THE INVENTION

The present invention relates generally to the production of controlled atmosphere environments, and more particularly to a device used for the control of oxygen levels within transport container vessels, such as bulk rail cars used for the transportation of food products, such as grains, rice, flour, peanuts, sugar, and the like.

BACKGROUND OF THE INVENTION

Food products, such as grains, rice, flour, peanuts, sugar, and the like are typically transported in bulk by rail cars, trucks, and other similar transportation means, with rail car transport being one of the most-often used methods. Commonly found in such stored food products are insects, larvae, and eggs which are often introduced into the products during transport. The infestation which often occurs to these types of products is particularly severe in the summer months, though such infestation occurs in the winter months as well. In recognition of the infestation which commonly occurs with the aforementioned types of food products during transport, it is well known to treat the food products with various types of pesticides during transport to kill the insects, larvae, and eggs therewithin. One pesticide which is typically utilized to treat the stored food products is aluminum phosphide which is sold under the tradename PHOSTOXIN. Typically, the pesticides are applied to the stored food products as a fumigant or in a block form which is interposed in the container vessel.

Recently, various medical studies have concluded that the pesticides currently utilized to treat the aforementioned food products during transport give rise to various health risks upon long-term exposure or contamination. In this respect, studies conducted at the University of Minnesota, Laboratory of Environmental Medicine and Pathology, have found that an elevated incidence of chromosomal aberrations occurs in blood lymphocytes of male rats exposed to 3 ppm and higher concentrations of phosphene. These studies have also found that phosphene attacks DNA in humans causing chromosome aberrations. In recognition of the health risks associated with such chemicals, those individuals involved in the loading and unloading of the aforementioned types of products from rail cars and other container vessels are often required to wear protective gear and breathing apparatus to prevent exposure to the high levels of the chemicals present in the container environment. With regard to the rail car transport of these products, recent legislation which has been enacted to mitigate some of the health risks associated with the unloading of the rail cars requires that the rail cars be vented during transport immediately prior to the unloading thereof. Such legislation also requires that people in the vicinity of the area where the rail cars are vented be alerted that the venting is occurring.

As an alternative to the utilization of chemical pesticides to treat the stored food products during transport, it has been found that lowering the oxygen level within the transport container vessel to 5% or less and maintaining this level for extended periods of time has a toxic effect on the insects, larvae, and eggs found in the products. It has also been shown that a small percentage of carbon dioxide in combination with a low oxygen level can decrease the kill time, thereby increasing the effectiveness of the low oxygen levels within the container vessel. The present invention recognizes the health risks associated with the use of pesticides by providing a replacement for such pesticides in the form of a system utilizing nitrogen-generating membranes to create an atmosphere within the transport container vessel not exceeding a 5% oxygen level.

SUMMARY OF THE INVENTION

In accordance with the preferred embodiment of the present invention, there is provided a system for maintaining a controlled oxygen atmosphere within a transport container vessel for purposes of killing insects, larvae, and eggs within bulk materials, such as grains, rice, flour, peanuts, sugar, and the like, transported in the container. The system is adapted to be utilized in conjunction with rail cars, though it will be recognized that the system may also be utilized in conjunction with other types of transport container vessels.

The system generally comprises a first inlet which is adapted to receive ambient air from outside the rail car. Fluidly connected to the first inlet is an oilless air compressor having a compressor intake port connected to the first inlet and compressor exhaust port. The air compressor is powered by a small diesel engine which drives the compressor as well as a 12-VDC alternator. The compressor is preferably belt-driven, though it may alternatively be coupled directly to the engine bell housing. The 12-VDC alternator is also belt-driven from the engine crank shaft. In the preferred embodiment, the alternator charges a 12-V battery and supplies power to a controller assembly, as will be discussed below.

Fresh air is drawn into the first inlet and into an air filter disposed therein by the compressor where particulates are removed down to 10.0 microns. Thereafter, the filtered air enters the compressor and is compressed to 100 psig. The compressed air is then cooled through a finned tubing heat exchanger connected to the exhaust port of the compressor and subsequently enters a receiving tank. The compressed air is then filtered to 0.3 microns by second and third filters connected to the outlet of the receiving tank. A drain solenoid interfaced to the receiving tank and second and third filters is periodically actuated by the controller assembly to remove water condensates.

After passing through the second and third filters, the compressed air passes through a relieving regulator which prevents the compressed air pressure from exceeding a 125-psig maximum compressor rating. Additionally, a 150-psig high-pressure safety relief valve prevents an over-pressurization situation from occurring. The compressed air then passes through and is heated by an electric air heater to approximately 30°–50° C. A thermistor senses the air temperature and relays the signal to the controller assembly, while a high-temperature safety switch prevents overheating in the event of a thermistor failure.

The heated, filtered, compressed air then enters a gas-separation means via an entrance port and flows therethrough. The compressed air enters the bore of hollow fibers, i.e. membranes, within the gas-separation means where fast gases, such as $O_2$, $CO_2$, and $H_2O$ permeate through the walls of the fibers at a faster rate than slow gases, such as $N_2$. The rate at which the air passes through the membranes determines the volume and purity of the $N_2$ produced. After exiting the gas-separation means via an exit port, the gas passes into a first outlet fluidly connected to the exit port which is used to place the exit port in fluid communication with the interior of the rail car. Disposed within the first outlet is an adjustable needle valve which controls the $N_2$ flow rate and purity. In the preferred embodiment, the $N_2$ is pumped into the rail car through the unloading manifolds at the bottom of the car. Importantly, a continual stream of $N_2$ is added to eventually lower the $O_2$ level within the rail car to 5% or less. The system continues to generate $N_2$ for 2 to 10 days to insure that all insects, larvae, and eggs within the products being transported are effectively killed.

An optional $CO_2$ supply can also be used in conjunction with the nitrogen generation system to speed up the kill rate, thereby increasing the effectiveness of the present system. The $CO_2$ supply system preferably comprises a $CO_2$ supply source fluidly connected to the first outlet via a $CO_2$ valve connected therein. The $CO_2$ valve is movable between open and closed positions with the $CO_2$ supply source being operable to introduce $CO_2$ into the rail car via the first outlet when the $CO_2$ valve is actuated to the open position by the controller assembly. The $CO_2$ source preferably comprises a liquid $CO_2$ cylinder, though dry ice enclosed in an insulated container may be utilized as an alternative.

The present system further comprises a second outlet fluidly connected to the rail car adjacent the top thereof for receiving gas from therewithin. Connected to the second outlet is a gas-analyzing means for monitoring and recording the oxygen levels of the gas within the rail car. The gas-analyzing means may further be adapted to monitor and record the carbon dioxide levels of the gas within the rail car in the event a $CO_2$ supply is utilized in conjunction with the present system. In the preferred embodiment, the gas-analyzer means is disposed within the controller assembly to which the second outlet is connected with the controller assembly being adapted to selectively draw gas from within the rail car into the gas-analyzer means.

In the preferred embodiment, the controller assembly comprises a housing having a programmable microprocessor and a data storage means disposed therein, both of which are powered by the alternator. The housing further includes a display device which is also powered by the alternator. Disposed within the housing and electrically interfaced to the microprocessor is a control valve which is selectively actuatable between first and second, positions, the second outlet being fluidly connected to the control valve. Also disposed within the housing and electrically interfaced to the microprocessor is a pump which is fluidly connected between the control valve and the gas-analyzer means. In the preferred embodiment, activation of the pump concurrently with the actuation of the control valve to the first position by the microprocessor draws gas from within the rail car into the gas-analyzer means so that the gas-analyzer means may transmit oxygen and/or carbon dioxide level measurements of the gas to the data storage means and to the display device. The gas-analyzer means preferably comprises an oxygen sensor and a carbon dioxide sensor, both of which are fluidly connected to the pump. As previously specified, the oxygen and carbon dioxide sensors are preferably disposed within the controller housing, though they may alternatively be disposed within the rail car.

The present system further comprises a first passage which fluidly connects the first outlet to the control valve. In the preferred embodiment, the control valve is operable to place the first outlet in fluid communication with the gas-analyzer means via the first passage while simultaneously blocking the communication between the second outlet and the gas-analyzer means when actuated to the second position by the microprocessor. This manner of operation allows the gas-analyzer means to monitor the oxygen and carbon dioxide levels of gas exiting the gas-separation means during system start-up. The control valve is further operable to block the communication between the first passage and the gas-analyzer means when actuated to the first position.

In the preferred embodiment, the controller assembly of the present system further includes an air-calibration means for calibrating the gas-analyzer means by passing ambient air therethrough when activated by the microprocessor. The air-calibration means preferably comprises an air-calibration valve electrically interfaced to the microprocessor and disposed within the housing between the control valve and the pump which is movable between first and second positions. The air-calibration means further includes a fresh air inlet which is connected to the air-calibration valve. The air-calibration valve is operable to place the control valve in fluid communication with the gas-analyzer means while simultaneously blocking the fresh-air inlet when actuated to the first position by the microprocessor, and place the fresh-air inlet in fluid communication with the gas-analyzer means while simultaneously blocking the communication between the control valve and the gas-analyzer means when actuated to the second position by the microprocessor.

In addition or as an alternative to the air-calibration means, the controller assembly may also include a gas-calibration means for calibrating the gas-analyzer means by passing a pre-selected calibrating gas therethrough when activated by the microprocessor. The gas-calibration means preferably comprises a gas-calibration valve electrically interfaced to the microprocessor and disposed within the housing between a calibrating gas source and the gas-analyzer means. The gas-calibration valve is movable between open and closed positions and is operable to place the calibrating gas source in fluid communication with the gas-analyzer means when actuated to the open position by the microprocessor. When the gas-calibration valve is actuated to the open position by the microprocessor, the microprocessor further acts to actuate the control valve to the first position, the air-calibration valve to the second position, and deactivate the pump.

BRIEF DESCRIPTION OF THE DRAWINGS

These as well as other features of the present invention will become more apparent upon reference to the drawings wherein.

DETAILED DESCRIPTION OF THE PREFERRED EMBODIMENT

Figure 1:
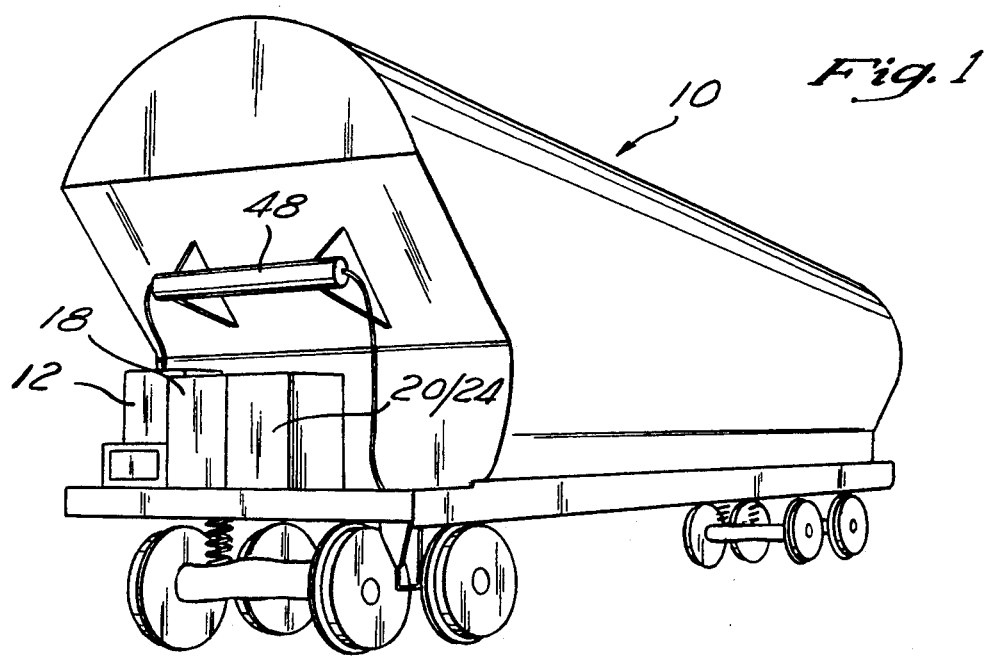
FIG. 1 is a perspective view of a rail car incorporating the controlled atmosphere system of the present invention.
Figure 2:
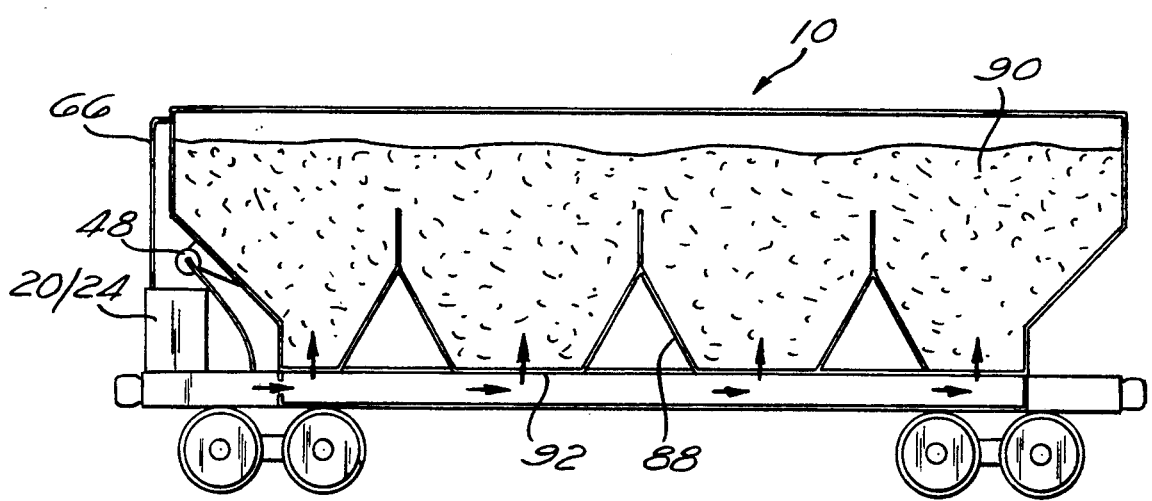
FIG. 2 is a cross-sectional view of the rail car shown in FIG. 1 illustrating the manner in which gas produced from the system is inputted into the rail car and gas is drawn from within the rail car.
Figure 3:
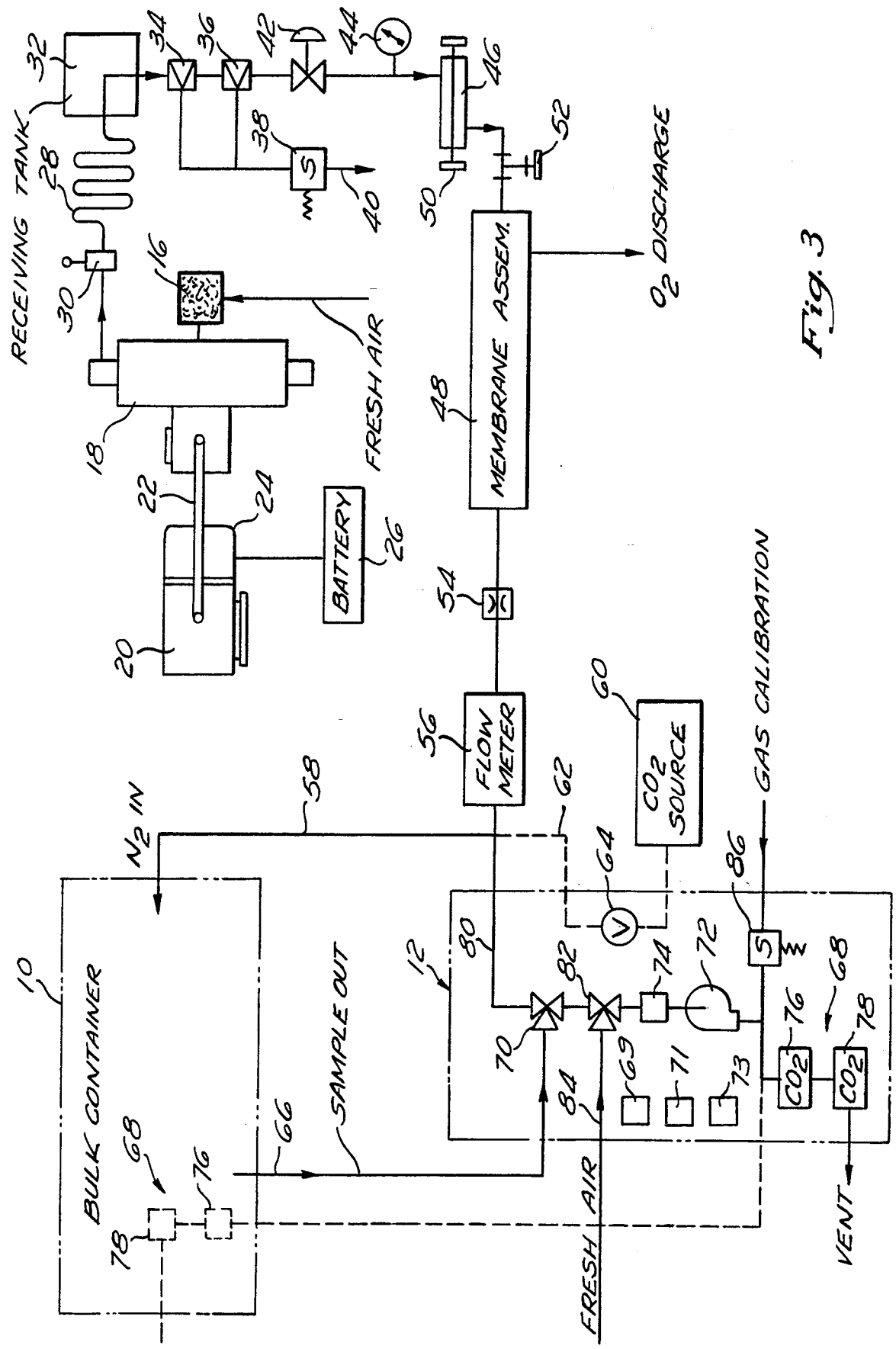
FIG. 3 is a schematic piping and control diagram of the present system.

Referring now to the drawings wherein the showings are for purposes of illustrating a preferred embodiment of the present invention only, and not for purposes of limiting the same, FIG. 3 schematically illustrates the system for maintaining a controlled oxygen atmosphere within a closed transport container vessel, such as a bulk rail car 10, as shown in FIGS. 1 and 2. Though the present invention as will hereinafter be described is preferably used in conjunction with the rail car 10, it will be recognized that the system may be utilized in conjunction with other types of transport containers. In the preferred embodiment, the system is used in conjunction with rail cars 10 which are used for the transportation of food products, such as grains, rice, flour, peanuts, sugar, and the like. In this respect, the system is utilized as an alternative to the chemical pesticides with which the aforementioned food products are typically treated during transport for purposes of lowering the oxygen level within the rail car 10 to 5% or less, and preferably 1% or less, and maintaining this level for extended periods of time to have a toxic effect on the insects, larvae, and eggs that commonly infect such products during transport.

The system constructed in accordance with the present invention as interfaced to the rail car 10 comprises two independent air flow paths. The first path is adapted to draw air from outside the rail car 10 and, after processing of the same, subsequently introduce low oxygen gas into the rail car 10. The second path is adapted to draw a quantity of the processed air from inside the rail car 10 for sampling purposes. Importantly, each of the two flow paths include components which are electrically and mechanically interfaced to a controller assembly 12 which is adapted to coordinate the operation of each of the two flow paths.

AIR INLET SYSTEM STRUCTURE AND OPERATION

As depicted in FIG. 3, the air flow path of the present invention which draws air from outside of the rail car 10 and subsequently introduces a processed gas into the rail car 10 generally comprises a first inlet 14 which is adapted to receive ambient air from outside of the rail car 10. Disposed within the first inlet 14 is a first filter 16 wherein particulates are removed from the ambient air down to 10.0 microns. After passing through the first filter 16, the filtered air enters a small oilless air compressor 18 via an intake port thereof. In the preferred embodiment, the compressor 18 is powered by a small diesel engine 20 which drives the compressor 18 via a belt 22. In addition to driving the compressor 18, the diesel engine 20 further drives a 12-VDC alternator 24 which is directly coupled thereto. Like the compressor 18, the alternator 24 may alternatively be belt-driven from the engine crank shaft. Additionally, as an alternative to being driven by the belt 22, the air compressor 18 may be coupled directly to the engine bell housing. In the preferred embodiment, the alternator 24 charges a 12-V battery 26 and supplies power to the controller assembly 12, as will be explained in greater detail below. As will be recognized, the activation of the compressor 18 by the start-up of the engine 20 causes air to be drawn into the first inlet 14 and first filter 16 by the compressor 18. In the preferred embodiment, the filtered air entering the air compressor 18 is compressed to 100 psig. As previously specified, the air compressor 18 is adapted to be oilless. Importantly, since compressor 18 contains no oil, problems associated with oil carry-over are totally eliminated. To eliminate the need for oil, compressor 18 utilizes Teflon rings and piston skirts for lubrication. Additionally, all bearings within the compressor 18 are permanently greased and sealed.

After being compressed by the compressor 18, the air exits the compressor 18 via an exhaust port and passes into a finned tubing heat exchanger 28 after passing through a high pressure relief valve 30. As will be recognized, by passing through the coolant coils of the heat exchanger 28, the compressed air is cooled. The relief valve 30 comprises a 150 psig high safety relief valve which is used to prevent an over-pressurization situation from occurring. After passing through the relief valve 30 and heat exchanger 28, the compressed air enters a receiving tank 32. After exiting the receiving tank 32, the compressed air passes through a second filter 34 and a third filter 36 which are operable to filter the air to 0.3 microns and, remove moisture therefrom. In the preferred embodiment, the receiving tank 32, second filter 34, and third filter 36 are each interfaced to a drain solenoid valve 38 which is electrically interfaced to and periodically activated by the controller assembly 12 for purposes of removing water condensates from the receiving tank 32 and filters 34, 36 via a drain line 40. In the preferred embodiment, the drain solenoid valve 38 is activated by the controller assembly 12 to drain the water every hour, though other time increments may be substituted.

After passing through the filters 34, 36, the compressed air passes through a relieving regulator 42 which prevents the compressed air pressure from exceeding a 125 psig maximum compressor rating. Thereafter, the air passes through a pressure gauge 44 which provides a visual reading of the system air pressure. After passing through the relieving regulator 42 and pressure gauge 44, the air passes into an electric heater 46 which is also electrically interfaced to the controller assembly 12. Heater 46 is operable to heat the compressed air to a temperature set point of approximately 50° C. before the air enters into a gas-separation means 48. A thermistor 50 attached to the heater 46, which is electrically interfaced to the controller assembly 12, relays a temperature signal to the controller assembly 12. Additionally, a high-temperature safety switch 52 disposed between the heater 46 and gas-separation means 48 prevents overheating in the event of a failure of the thermistor 50.

After passing through the heater 46, the heated, filtered compressed air enters the gas-separation means 48 via an entrance port thereof. In the preferred embodiment of the present invention, gas-separation means 48 comprises a membrane assembly which includes a plurality of hollow fiber permeable membranes disposed therein. Importantly, when compressed air enters the bores of the hollow fiber permeable membranes, fast traveling gases, such as oxygen ($O_2$) and carbon dioxide ($CO_2$) as well as water, are able to permeate through the walls of the membranes at a faster rate than slower traveling gases, such as nitrogen ($N_2$). Thus, the rate at which the air passes through the membranes determines the volume and purity of the $N_2$ which is produced by and exits through the exit port of the gas-separation means 48. The permeable membranes preferably utilized in conjunction with the present invention are manufactured by Permea, Inc. and are more thoroughly disclosed in United States Letters Patent No. 4,880,441, the disclosure of which is expressly incorporated herein by reference.

After passing through the gas-separation means 48, the $N_2$ passes through an adjustable needle valve or fixed orifice 54 which is operable to control the $N_2$ flow rate and purity from the gas-separation means 48. In this respect, the fixed orifice 54 is operable to control the purity level of the $N_2$ to 99% or better. After passing through the fixed orifice 54, the $N_2$ passes through a flow meter 56 which provides an indication as to the flow rate of the $N_2$ exiting the gas-separation means 48. The $N_2$ is then piped into the bulk rail car 10 via a first outlet 58 fluidly connected to the exit port of gas separation means 48. Importantly, a continual stream of $N_2$ is added to the interior of the rail car 10 or other container vessel to eventually lower the $O_2$ level to 5% or less and preferably 1% or less. In the preferred embodiment, the system continues to generate $N_2$ for two to ten days to insure that all insects, larvae, and eggs which may be within the stored materials are effectively killed.

As previously specified, it has been determined that the introduction of a small percentage of carbon dioxide ($CO_2$) in combination with the low oxygen, high nitrogen gas within the container 10 can decrease the kill time of the insects, larvae, and eggs and thus increase the effectiveness of the present system. In this respect, the present system may include an optional carbon dioxide supply source which may be used in addition to the nitrogen generation system to speed up the kill rate. The $CO_2$ supply means preferably comprises a $CO_2$ source 60 which is fluidly connected to the first outlet 58 via a $CO_2$ line 62. Disposed within the $CO_2$ line 62 is a $CO_2$ valve 64 which is electrically interfaced to the controller assembly 12 and preferably disposed therein. In the preferred embodiment, the $CO_2$ source 60 is operable to introduce carbon dioxide into the rail car 10 via the $CO_2$ line 62 and first outlet 58 when the $CO_2$ valve 64 is actuated to an open position by the controller assembly 12. In the preferred embodiment, the carbon dioxide level within the rail car 10 is preferably maintained at a level from 1% to 10% to augment the effects of the reduced oxygen levels within the rail car 10. Additionally, the $CO_2$ valve 64 is preferably periodically actuated by the controller assembly 12 to allow carbon dioxide to enter the rail car 10, as will be described below. The carbon dioxide source 60 preferably comprises a liquid $CO_2$ cylinder, though dry ice enclosed in an insulated container may be utilized as an alternative.

AIR SAMPLING SYSTEM STRUCTURE AND OPERATION

The second air flow path of the present invention consists of an air sampling system which is used to continuously monitor and record the oxygen levels of gas within the rail car 10. Additionally, in the event the $CO_2$ source 60 is included with the system, the second path is also utilized to monitor and record the carbon dioxide levels of gas within the rail car 10. Connected to the rail car 10 is a second outlet 66 which is adapted to receive gas from within rail car 10. In the preferred embodiment, second outlet 66 is fluidly connected to the controller assembly 12, and more particularly to a gas-analyzer means 68 disposed therein.

Figure 4:
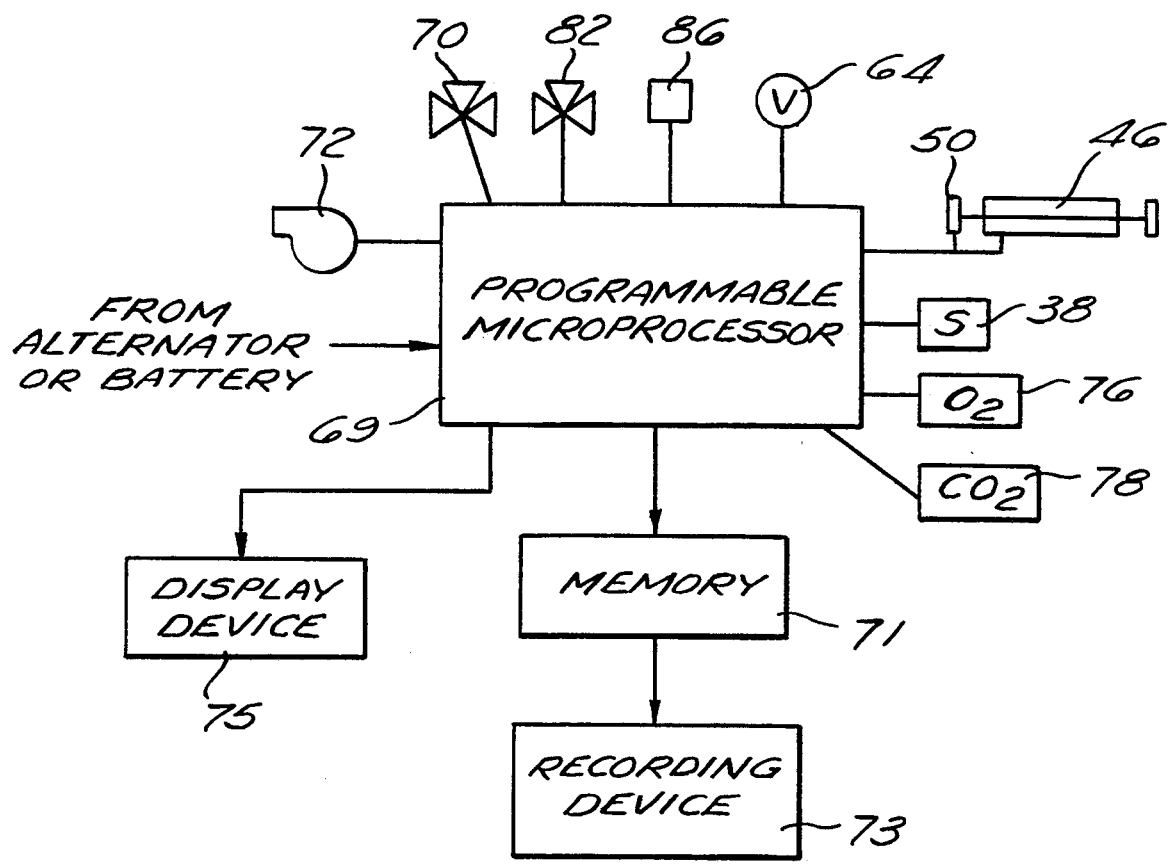
FIG. 4 is a schematic of the processor, memory, recording, and display components of the controller assembly of the present system.

Referring now to FIGS. 3 and 4, the controller assembly 12 comprises a housing having a programmable microprocessor 69 disposed therein to which the gas-analyzer means 68 is electrically interfaced. Interfaced to the microprocessor 69 is a display device 75 as well as a data storage means which preferably comprises an electronic buffer or digital memory unit 71. The memory unit 71 may in turn be interfaced to a recording device 73, such as a plotter or PC. Both the memory unit 71 and display device 75 are disposed within the housing. In the preferred embodiment, oxygen levels and/or carbon dioxide levels monitored by the gas-analyzer means 68 are transferred to the memory unit 71 and the display device 75 via the microprocessor 69. After transportation of the products has been completed, the oxygen and/or carbon dioxide level measurements stored in the memory unit 71 may be dumped to the recording device 73. Also disposed within the housing between the second outlet 66 and the gas-analyzer means 68 is a control valve 70, comprising a three-way solenoid movable between first and second positions, to which the second outlet 66 is fluidly connected. The controller assembly 12 further includes a pump 72 disposed therein which is connected between the control valve 70 and gas-analyzer means 68, as well as a pump filter 74 which is disposed within the housing between the pump 72 and control valve 70. Both the control valve 70 and pump 72 are electrically interfaced to the microprocessor 69. In the preferred embodiment, activation of the pump 72 concurrently with the actuation of the control valve 70 to the first position by the microprocessor 69 draws gas from within the rail car 10 into the gas-analyzer means 68, thereby allowing the gas-analyzer means 68 to transmit oxygen level measurements of the gas to the memory unit 71 and display device 75 via the microprocessor 69.

The gas-analyzer means preferably comprises an oxygen sensor 76 and a carbon dioxide sensor 78. It will be recognized that in the event the $CO_2$ source 60 is not included with the present system, the carbon dioxide sensor 78 may be eliminated from the gas-analyzer means 68. Additionally, the oxygen sensor 76 and carbon dioxide sensor 78 are preferably disposed within the housing of the controller assembly 12, though the sensors may alternatively be disposed within the rail car 10 or other container vessel. As previously indicated, the gas-analyzer means 68 comprising the oxygen and carbon dioxide sensors 76, 78 is adapted to monitor and record the oxygen and carbon dioxide levels within the rail car 10 when the control valve 70 is actuated to the first position by the microprocessor 69. In the preferred embodiment, gas within the rail car 10 is sampled continuously. As such, the control valve 70 is almost always actuated to the first position with the pump 72 being maintained in an activated state almost continuously. Those instances where the control valve 70 is actuated to the second position and the pump 72 deactivated will be explained below. During the continuous sampling procedure, the sensors 76, 78 take measurements of the oxygen and carbon dioxide levels of the gas approximately every two seconds. Once approximately every twenty minutes, the microprocessor 69 takes the average of the measurement values which is, in turn, transmitted to the memory unit 71 as well as the display device 75. In the event a reading of the carbon dioxide level indicates that the level is below a level preprogrammed into the microprocessor 69, the microprocessor 69 will actuate the $CO_2$ valve 64 to the open position to allow carbon dioxide to enter the rail car 10. The storage of the oxygen level measurements and/or carbon dioxide level measurements is used to verify the integrity of the shipment by providing an indication that the oxygen levels were maintained at a particular level, i.e. not exceeding 5%.

It has also been determined that the kill rate of the insects, larvae, and eggs is also based on the temperature of the gas entering the rail car 10. As such, though the present system does not include a means within the controller assembly 12 for monitoring the temperature of the gas, it will be recognized that such a monitoring means may also be included.

As previously specified, though the control valve 70 is almost always in the first position to allow gas to pass from the interior of the rail car 10 into the gas-analyzer means 68, during initial start-up of the system the control valve 70 is typically actuated to the second position. In this respect, the present system further comprises a first passage 80 which fluidly connects the first outlet 58 to the control valve 70. Importantly, when in the second position, the control valve 70 is operable to place the first outlet 58 in fluid communication with the gas-analyzer means 68 via the first passage 80 while simultaneously blocking the communication between the second outlet 66 and gas-analyzer means 68. Thus, actuating the control valve 70 to the second position allows the gas-analyzer means 68 to take and record a measurement of the oxygen level of gas exiting the gas-separation means 48. As will be recognized, when the control valve 70 is in the first position, the communication between the first passage 80 and gas-analyzer means 68 is blocked thereby.

CALIBRATION PROCEDURES

In the present invention, both the oxygen sensor 76 and carbon dioxide sensor 78 require periodic calibration. In the preferred embodiment, two types of calibration methods are utilized, i.e. an air calibration method and a gas calibration method. In the air calibration method, the gas-analyzer means 68 is calibrated by passing ambient air therethrough. Disposed between the control valve 70 and pump filter 74 is an air calibration valve comprising a three-way solenoid valve which is disposed within the housing and electrically interfaced to the microprocessor 69. Additionally, the air calibration valve 82, like the control valve 70, is movable between first and second positions. Fluidly connected to the air calibration valve 82 is a fresh air inlet 84. When actuated to the first position by the microprocessor 69, the air calibration valve 82 is operable to place the control valve 70 in fluid communication with the gas-analyzer means 68 while simultaneously blocking the fresh air inlet 84. As will be recognized, actuation of the air calibration valve 82 to the first position occurs when no air calibration procedure is occurring. When actuated to the second position by the microprocessor 69, the air calibration valve 82 is operable to place the fresh air inlet 84 in fluid communication with the gas-analyzer means 68 while simultaneously blocking the communication between the control valve 70 and gas-analyzer means 68. As such, actuation to the second position occurs when an air calibration procedure is taking place. Importantly, when the air calibration valve 82 is actuated to the second position during an air calibration procedure, the pump 72 is maintained in an activated state to draw the fresh air into the inlet 84 and through the gas-analyzer means 68. During the air calibration procedure, the microprocessor 69 allows time for the oxygen sensor 76 and carbon dioxide sensor 78 to be purged with outside air and then assumes the readings to be 0.1% carbon dioxide and 20.8% oxygen. These readings are used as base-line settings for the next hour. Importantly, the assumed carbon dioxide and oxygen levels coincide with the oxygen and carbon dioxide levels typically found in ambient air.

In addition or as an alternative to the air calibration, the present system further includes a gas calibration system, which functions by passing a preselected calibrating gas through the gas-analyzer means 68 when activated by the microprocessor 69. The gas calibration system comprises a gas calibration valve 86 which is electrically interfaced to the microprocessor 69 and disposed within the housing of the controller assembly 12 between a calibrating gas source and the gas-analyzer means 68. The gas calibration valve 86 is movable between open and closed positions and is operable to place the calibrating source in fluid communication with the gas-analyzer means 68 when actuated to the open position by the microprocessor 69. Importantly, when the gas calibration valve 86 is actuated to the open position to allow the calibrating gas to enter the gas-analyzer means 68, the control valve 70 is actuated to the first position, the air calibration valve 82 is actuated to the second position, and the pump 72 is deactivated. Thus, though there is an open path between the interior of the rail car 10 and the pump 72, the temporary deactivation of the pump 72 prevents the gas from within the rail car 10 from mixing or interfering with the calibrating gas. Though not shown, a check valve may also be inserted at the outlet of the pump 72 to prevent any gas from the interior of the rail car 10 from interfering with the gas calibration procedure. When a gas calibration procedure is being conducted, the pressure of the calibrating gas source forces the gas through the open gas calibration valve 86 and into the gas-analyzer means 68. After allowing time for the gas-analyzer means 68 to be purged with the calibrating gas the microprocessor 69 uses the readings obtained by the sensors 76, 78 as a gain setting until the next gas calibration procedure is conducted. Importantly, if the microprocessor 69 detects no difference between the gas calibration and the previous air calibration, it assumes that no gas calibration gas was made available and continues to use the previous gas calibration values. This particular occurrence will also cause an error message to be produced on the display device 75.

In the preferred embodiment, an air calibration and/or gas calibration procedure is conducted once every hour. Additionally, such procedures may also be manually requested when desired. Concurrently with the hourly calibration procedure, as previously indicated, the drain solenoid valve 38 which is electrically interfaced to the controller 12, and more particularly to the microprocessor 69, is activated so as to dump any water into the drain line 40. Importantly, performing a manual air or gas calibration procedure resets the time to the next automatic air or gas calibration procedure to one hour. Additionally, when the controller assembly 12 is powered up without a valid gas calibration or air calibration in its battery-backed memory unit 71, it cannot display valid oxygen and carbon dioxide values. In this case, an air or gas calibration is needed before normal operation is possible.

The source of the calibrating gas used in the gas calibration procedure is preferably a portable tank of calibrating gas which includes a pressure-regulator and flow restrictor attached thereto. Additionally, the gas calibration valve 86 preferably includes a quick-connect fitting that seals the tank side of the connection when separated.

CONTROLLER STRUCTURE AND OPERATION

As previously indicated, the controller assembly 12 houses the microprocessor 69, memory unit 71, and display device 75 of the present system as well as the gas-analyzer means 68, $CO_2$ valve 64, control valve 70, air calibration valve 82, pump filter 74, pump 72, and gas calibration valve 86. In the preferred embodiment, the controller assembly 12 and the aforementioned components disposed therein are powered by the alternator 24 attached to the diesel engine 20. In addition to the alternator 24 providing power to the components of the controller assembly 12, the alternator 24 further provides power to the drain solenoid valve 38 and heater 46, both of which are also electrically interfaced to the microprocessor 69. As seen in FIG. 4, as also previously indicated, the microprocessor 69 is further electrically interfaced to the pump 72, control valve 70, air calibration valve 82, gas calibration valve 86, $CO_2$ valve 64, oxygen sensor 76, and carbon dioxide sensor 78 to control their operation. In the event that the alternator 24 fails during transportation of the food products, the battery 26 is included to provide power to all of the aforementioned components.

Having thus described the components of the present system, the manner in which the system is interfaced to the rail car 10 will now be described. Referring now to FIGS. 1 and 2, the rail car 10 typically defines a plurality of interior compartments or hoppers 88 into which the grain 90 or other material is stored. In the preferred embodiment, the diesel engine 20, alternator 24, and air compressor 18 are attached to one end of the rail car 10. Also attached to the end of the rail car 10 is the controller assembly 12. The gas-separation means 48 is preferably attached to the end of the rail car 10 immediately above the compressor 18, diesel engine 20, and alternator 24.

In the preferred embodiment, $N_2$ exiting the gas-separation means 48 via the first outlet 58 is preferably piped into the bulk rail car 10 through the unloading manifolds 92 disposed at the bottom of the rail car 10. Additionally, the gas drawn from within the rail car 10 via the second outlet 66 is preferably drawn from the top of the rail car 10. As will be recognized, having the $N_2$ inputted into the bottom of the rail car 10 and the gas drawn from the top thereof allows the low-oxygen gas to permeate completely through the grain 90 or other materials stored within the hoppers 88 within the rail car 10. As previously specified, as an alternative to being disposed within the controller assembly 12, the oxygen sensor 76 and carbon dioxide sensor 78 may be disposed within the open portion of the rail car 10 above the level of the grain 90 or other product therewithin.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A device for maintaining a controlled oxygen atmosphere within a transport container vessel comprising:
    a first inlet adapted to receive ambient air from outside said container;
    a compressor having a compressor intake port fluidly connected to said first inlet and a compressor exhaust port;
    a gas-separation means having an entrance port fluidly connected to said compressor exhaust port and an exit port, said compressor and said gas-separation means being collectively operable to maintain an oxygen level within said container not exceeding 5%;
    a first outlet fluidly connected to said exit port for placing said exit port in fluid communication with the interior of said container;
    a second outlet fluidly connected to said container for receiving gas from therewithin;
    a gas-analyzer means connected to said second outlet for monitoring and recording the oxygen levels of gas within the container;
    a controller assembly connected between said second outlet and said gas-analyzer means, said controller assembly being adapted to selectively draw gas from within said container into said gas-analyzer means, and said controller assembly comprising a housing, a programmable microprocessor disposed within said housing and a data storage means disposed within said housing and electrically interfaced to said gas-analyzer means.
    a control valve disposed within said housing, said control valve being electrically interfaced to said microprocessor and actuatable between first and second positions, said second outlet being fluidly connected to said control valve;
    a pump electrically interfaced to said microprocessor and fluidly connected between said control valve and said gas-analyzer means wherein activation of said pump concurrently with the actuation of said control valve to the first position by said microprocessor draws gas from within the container into the gas-analyzer means, said gas-analyzer means being operable to transmit oxygen level measurements of the gas to the data-storage means;
    a first passage fluidly connecting said first outlet to said control valve, said control valve being operable to place said first outlet in fluid communication with said gas-analyzer means via said first passage while simultaneously blocking the communication between said second outlet and said gas-analyzer means when actuated to the second position by said microprocessor, thereby allowing said gas-analyzer means to monitor the oxygen level of gas exiting said gas-separation means, said control valve being further operable to block the communication between said first passage and said gas-analyzer means when actuated to said first position.

2. The device of claim 1 wherein the oxygen level does not exceed 1%.

3. The device of claim 1 wherein said first outlet is fluidly connected to the container adjacent the bottom thereof, and said second outlet is fluidly connected to the container adjacent the top thereof.

4. The device of claim 1 further comprising a carbon dioxide supply means fluidly connected to said first outlet via a $CO_2$ valve electrically interfaced to said microprocessor and movable between open and closed positions, said carbon dioxide supply means being operable to introduce CO$_2$ into said container via said first outlet when said CO$_2$ valve is actuated to the open position by said microprocessor.

5. The device of claim 4 wherein and gas-analyzer means is further adapted to monitor and record the carbon dioxide levels of gas within the container when the control valve is actuated to the first position by the microprocessor.

6. The device of claim 5 wherein said gas-analyzer means comprises an oxygen sensor and a carbon dioxide sensor fluidly connected to said pump.

7. The device of claim 6 wherein said oxygen sensor and said carbon dioxide sensor are disposed within said housing.

8. The device of claim 6 wherein said oxygen sensor and said carbon dioxide sensor are disposed within said container.

9. The device of claim 5 wherein said controller assembly further comprises an air-calibration means for calibrating said gas-analyzer means by passing ambient air therethrough when activated by said microprocessor.

10. The device of claim 9 wherein said air-calibration means comprises:

an air-calibration valve movable between first and second positions, said air calibration valve being electrically interfaced to the microprocessor and disposed within said housing between said control valve and said pump; and a fresh-air inlet connected to said air-calibration valve;

wherein said air-calibration valve is operable to place said control valve in fluid communication with said gas-analyzer means while simultaneously blocking said fresh-air inlet when actuated to said first position by said microprocessor, and place said fresh-air inlet in fluid communication with said gas-analyzer means while simultaneously blocking the communication between said control valve and said gas-analyzer means when actuated to the second position by said microprocessor, said pump being activated by the microprocessor to draw air into the fresh-air inlet when the air-calibration valve is actuated to the second position.

11. The device of claim 5 wherein said controller assembly further comprises a gas-calibration means for calibrating said gas-analyzer means by passing a preselected calibrating gas through said gas-analyzer means when activated by said microprocessor.

12. The device of claim 11 wherein said gas-calibration means comprises:

a gas-calibration valve movable between open and closed positions, said gas-calibration valve being electrically interfaced to said microprocessor and disposed within said housing between a calibrating gas source and said gas-analyzer means, said gas-calibration valve being operable to place said calibrating gas source in fluid communication with said gas-analyzer means when actuated to the open position by said microprocessor;

said control valve being actuated to the first position, said air-calibration valve being actuated to the second position, and said pump being deactivated when said gas-calibration valve is actuated to the open position by said microprocessor.

13. The device of claim 5 wherein said controller assembly further comprises an air-calibration means for calibrating said gas-analyzer means by passing ambient air therethrough when activated by said microprocessor and a gas-calibration means for calibrating said gas-analyzer means by passing a pre-selected calibrating gas through said gas-analyzer means when activated by said microprocessor.

14. The device of claim 1 further comprising a heater means connected between said compressor exhaust port and said gas-separation means for heating ambient air circulated by said compressor to a predetermined temperature prior to entering said gas-separation means.

15. The device of claim 14 further comprising at least one filter connected between said compressor exhaust port and said heating means, said filter being operable to remove moisture from air exhausted by said compressor.

16. The device of claim 15 wherein said first filter includes a drain valve electrically interfaced to said microprocessor connected thereto for periodically draining water removed from the air by said filter.

17. The device of claim 1 further comprising a flow valve connected within said first outlet between said gas-separation means exit port and said container, said flow valve being operable to regulate the flow of air through said gas-separation means.

18. The device of claim 1 wherein said compressor comprises an oilless compressor.

19. The device of claim 1 wherein said container comprises a bulk rail car.

20. The device of claim 1 wherein said compressor is driven by a diesel motor having a generator interfaced thereto, said generator being electrically connected to and operable to power said microprocessor.

21. The device of claim 9 wherein said CO$_2$ supply means comprises a liquid CO$_2$ cylinder connected to said CO$_2$ valve.

* * * * *